United States Patent
Giaretta et al.

(10) Patent No.: US 9,560,140 B2
(45) Date of Patent: Jan. 31, 2017

(54) SIGNALING IDENTIFICATION OF MACHINE TO MACHINE DEVICES AND SERVICES

(75) Inventors: Gerardo Giaretta, San Diego, CA (US); Josef J. Blanz, Forst (DE); Lorenzo Casaccia, Rome (IT); John Wallace Nasielski, San Diego, CA (US); Haipeng Jin, Carlsbad, CA (US); Krishna S. Pandit, Nuremberg (DE); Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 880 days.

(21) Appl. No.: 12/892,610

(22) Filed: Sep. 28, 2010

(65) Prior Publication Data

US 2011/0256896 A1 Oct. 20, 2011

Related U.S. Application Data

(60) Provisional application No. 61/246,830, filed on Sep. 29, 2009.

(51) Int. Cl.
*H04W 4/00* (2009.01)
*H04L 29/08* (2006.01)
(Continued)

(52) U.S. Cl.
CPC ............ *H04L 67/125* (2013.01); *H04W 4/00* (2013.01); *H04W 4/005* (2013.01); *H04W 72/048* (2013.01); *H04W 76/048* (2013.01)

(58) Field of Classification Search
CPC ...... H04W 4/00; H04W 4/005; H04W 72/048; H04W 76/048; H04L 67/125
(Continued)

(56) References Cited

U.S. PATENT DOCUMENTS 6,708,033 B1 * 3/2004 Linkola et al. ............... 455/440
2003/0076812 A1 4/2003 Benedittis
(Continued)

FOREIGN PATENT DOCUMENTS

| JP | 2003224874 A | 8/2003 |
|---|---|---|
| WO | 03063535 A1 | 7/2003 |
| WO | 2008094681 A1 | 8/2008 |

OTHER PUBLICATIONS

3rd Generation Partnership Project, Technical Specification Group Services and System Aspects, Feasibility Study on the Security Aspects of Remote Provisioning and Change of Subscription for M2M Equipment, (Release 9), 3GPP Standard, 3GPP TR 33.812, 3rd Generation Partnership Project (3GPP), Mobile Competence Centre, 650, Route Des Lucioles, F-06921 Sophia-Antipolis Cedex, France, No. VI.5.0, Jul. 1, 2009 (Jul. 1, 2009), pp. 1-87, XP050380629.
(Continued)

*Primary Examiner* — Raymond Dean
(74) *Attorney, Agent, or Firm* — François A. Pelaez

(57) ABSTRACT

Certain aspects of the present disclosure propose methods for identifying machine to machine (M2M) devices and services. Each device may indicate its M2M functionality either for each of the services performed by the device or for all of its services to a core network. The core network may report the M2M functionality of the device to other nodes in the network that may be involved with the M2M functionality of the device.

60 Claims, 15 Drawing Sheets

(51) Int. Cl.
*H04W 72/04* (2009.01)
*H04W 76/04* (2009.01)

(58) Field of Classification Search
USPC .............. 455/450–453, 509, 41.2, 518, 519; 709/227–229
See application file for complete search history.

(56) References Cited

U.S. PATENT DOCUMENTS

| | | | |
|---|---|---|---|
| 2005/0119008 | A1 | 6/2005 | Haumont |
| 2007/0291728 | A1* | 12/2007 | Dalsgaard et al. ............ 370/347 |
| 2007/0293216 | A1* | 12/2007 | Jiang ........................ H04W 4/12 455/433 |
| 2008/0181127 | A1 | 7/2008 | Terry et al. |
| 2009/0217348 | A1* | 8/2009 | Salmela et al. .................... 726/2 |
| 2010/0057485 | A1* | 3/2010 | Luft ................................. 705/1 |
| 2012/0184306 | A1* | 7/2012 | Zou et al. ..................... 455/458 |

OTHER PUBLICATIONS

3rd Generation Partnership Project, Technical Specification Group Services and System Aspects, Service requirements for machine-type communications, Stage 1 (Release 10), 3GPP Standard, 3GPP TS 22.368, 3rd Generation Partnership Project (3GPP), Mobile Competence Centre, 650, Route Des Lucioles, F-06921 Sophia-Antipolis Cedex, France, No. VI.0.0, Aug. 1, 2009 (Aug. 1, 2009), pp. 1-22, XP050361345.
Alcatel-Lucent, "M2M Communication", 3GPP Draft, R1-082813 M2M, 3rd Generation Partnership Project (3GPP), Mobile Competence Centre, 650, Route Des Lucioles, F-06921 Sophia-Antipolis Cedex, France, No. Jeju, 20080812, Aug. 12, 2008 (Aug. 12, 2008), XP050316306.
Ericsson, 3rd Generation Partnership Project (3GPP), Technicalspecification Group (TSG) Access Network (RAN), W0rkinggr0up (WG2), XX, XX, No. R2-060967, Mar. 27, 2006 (Mar. 27, 2006), pp. 1-5, XP002463498.
International Search Report and Written Opinion—PCT/US2010/050782—ISA/EPO—Mar. 15, 2011.
Taiwan Search Report—TW099115712—TIPO—Aug. 1, 2013.
"3rd Generation Partnership Project; Technical Specification Group Core Network; Mobile radio interface layer 3 specification; Core Network Protocols—Stage 3 (Release 1999)"; 3GPP TS 24.008 v3.9.0; Sep. 2001, p. 1 to 442, [Chapter 52.1 of pp. 148 to 149].
Taiwan Search Report—TW099133087—TIPO—Jul. 16, 2013.

\* cited by examiner

SIGNALING IDENTIFICATION OF MACHINE TO MACHINE DEVICES AND SERVICES

CLAIM OF PRIORITY UNDER 35 U.S.C. §119

The present Application for patent claims priority to Provisional Application No. 61/246,830 entitled "Signaling Identification of Machine to Machine Devices and Services" filed Sep. 29, 2009, and assigned to the assignee hereof and hereby expressly incorporated by reference herein.

TECHNICAL FIELD

Certain aspects of the present disclosure generally relate to wireless communication and, more particularly, to techniques for identifying machine to machine devices and services.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

CDMA2000 (also known as IMT Multi Carrier (IMT MC)) is a family of 3G mobile technology standards, which use CDMA channel access, to send voice, data, and signaling data between mobile phones and cell sites. The set of standards includes: CDMA2000 1×, CDMA2000 EV-DO Rev. 0, CDMA2000 EV-DO Rev. A, and CDMA2000 EV-DO Rev. B. All are approved radio interfaces for the ITU's IMT-2000. CDMA2000 has a relatively long technical history and is backward-compatible with its previous 2G iteration IS-95 (cdmaOne).

CDMA2000 1× (IS-2000), also known as 1× and 1×RTT, is the core CDMA2000 wireless air interface standard. The designation "1×", meaning 1 times Radio Transmission Technology, indicates the same RF bandwidth as IS-95: a duplex pair of 1.25 MHz radio channels. 1×RTT almost doubles the capacity of IS-95 by adding 64 more traffic channels to the forward link, orthogonal to (in quadrature with) the original set of 64. The 1× standard supports packet data speeds of up to 153 kbps with real world data transmission averaging 60-100 kbps in most commercial applications. IMT-2000 also made changes to the data link layer for the greater use of data services, including medium and link access control protocols and Quality of Service (QoS). The IS-95 data link layer only provided "best effort delivery" for data and circuit switched channel for voice (i.e., a voice frame once every 20 ms).

CDMA2000 1×EV-DO (Evolution-Data Optimized), often abbreviated as EV-DO or EV, is a telecommunications standard for the wireless transmission of data through radio signals, typically for broadband Internet access. It uses multiplexing techniques including code division multiple access (CDMA) as well as time division multiple access (TDMA) to maximize both individual user's throughput and the overall system throughput. It is standardized by 3rd Generation Partnership Project 2 (3GPP2) as part of the CDMA2000 family of standards and has been adopted by many mobile phone service providers around the world, particularly those previously employing CDMA networks.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EU-TRAN) series of specifications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method is provided for wireless communication. A node serves a population of devices for a wireless wide area network by assigning a default parameter for resource allocation of an airlink. The node receives a first signaling message indicating machine-to-machine (M2M) functionality from a first device of the population of devices. The node determines a first usage constraint associated with the M2M functionality. The node assigns an adjusted parameter for resource allocation of the airlink for the first device that complies with the first usage constraint.

In another aspect, at least one processor is provided for wireless communication. A first module serves a population of devices for a wireless wide area network by assigning a default parameter for resource allocation of an airlink. A second module receives a first signaling message indicating machine-to-machine (M2M) functionality from a first device of the population of devices. A third module determines a first usage constraint associated with the M2M functionality. A fourth module assigns an adjusted parameter for resource allocation of the airlink for the first device that complies with the first usage constraint.

In an additional aspect, a computer program product is provided for wireless communication. A non-transitory computer-readable medium stores sets of code. A first set of codes causes a computer to serve a population of devices for a wireless wide area network by assigning a default parameter for resource allocation of an airlink. A second set of codes causes the computer to receive a first signaling message indicating machine-to-machine (M2M) functionality from a first device of the population of devices. A third set of codes causes the computer to determine a first usage constraint associated with the M2M functionality. A fourth set of codes causes the computer to assign an adjusted parameter for resource allocation of the airlink for the first device that complies with the first usage constraint.

In another additional aspect, an apparatus is provided for wireless communication. The apparatus comprises means for serving a population of devices for a wireless wide area network by assigning a default parameter for resource allocation of an airlink. The apparatus comprises means for receiving a first signaling message indicating machine-to-machine (M2M) functionality from a first device of the population of devices. The apparatus comprises means for determining a first usage constraint associated with the M2M functionality. The apparatus comprises means for assigning an adjusted parameter for resource allocation of the airlink for the first device that complies with the first usage constraint.

In a further aspect, an apparatus is provided for wireless communication. A scheduler serves a population of devices for a wireless wide area network by assigning a default parameter for resource allocation of an airlink. A transceiver receives a first signaling message indicating machine-to-machine (M2M) functionality from a first device of the population of devices. A computing platform determines a first usage constraint associated with the M2M functionality. The scheduler further assigns an adjusted parameter for resource allocation of the airlink for the first device that complies with the first usage constraint.

In yet another aspect, a method is provided for wireless communication. A first device acquires service from a node that serves a population of devices for a wireless wide area network by assigning a default parameter for resource allocation of an airlink. The first device transmits a first signaling message indicating machine-to-machine (M2M) functionality to the node. The first device receives an assignment of an adjusted parameter for resource allocation of the airlink for the first device that complies with a first usage constraint associated with the M2M functionality.

In yet an additional aspect, at least one processor is provided for wireless communication. A first module acquires service from a node that serves a population of devices for a wireless wide area network by assigning a default parameter for resource allocation of an airlink. A second module transmits a first signaling message indicating machine-to-machine (M2M) functionality to the node. A third module receives an assignment of an adjusted parameter for resource allocation of the airlink for the first device that complies with a first usage constraint associated with the M2M functionality.

In yet a further aspect, a computer program product is provided for wireless communication. A non-transitory computer-readable medium stores sets of codes. A first set of codes causes a computer to acquire service from a node that serves a population of devices for a wireless wide area network by assigning a default parameter for resource allocation of an airlink. A second set of codes causes the computer to transmit a first signaling message indicating machine-to-machine (M2M) functionality to the node. A third set of codes causes the computer to receive an assignment of an adjusted parameter for resource allocation of the airlink for the first device that complies with a first usage constraint associated with the M2M functionality.

In another aspect, an apparatus is provided for wireless communication. The apparatus comprises means for acquiring service from a node that serves a population of devices for a wireless wide area network by assigning a default parameter for resource allocation of an airlink. The apparatus comprises means for transmitting a first signaling message indicating machine-to-machine (M2M) functionality to the node. The apparatus comprises means for receiving an assignment of an adjusted parameter for resource allocation of the airlink for the first device that complies with a first usage constraint associated with the M2M functionality.

In another further aspect, an apparatus is provided for wireless communication. A transceiver acquires service from a node that serves a population of devices for a wireless wide area network by assigning a default parameter for resource allocation of an airlink. A computing platform via the transceiver transmits a first signaling message indicating M2M functionality to the node. The transceiver further receives an assignment of an adjusted parameter for resource allocation of the airlink for the first device that complies with a first usage constraint associated with the M2M functionality.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
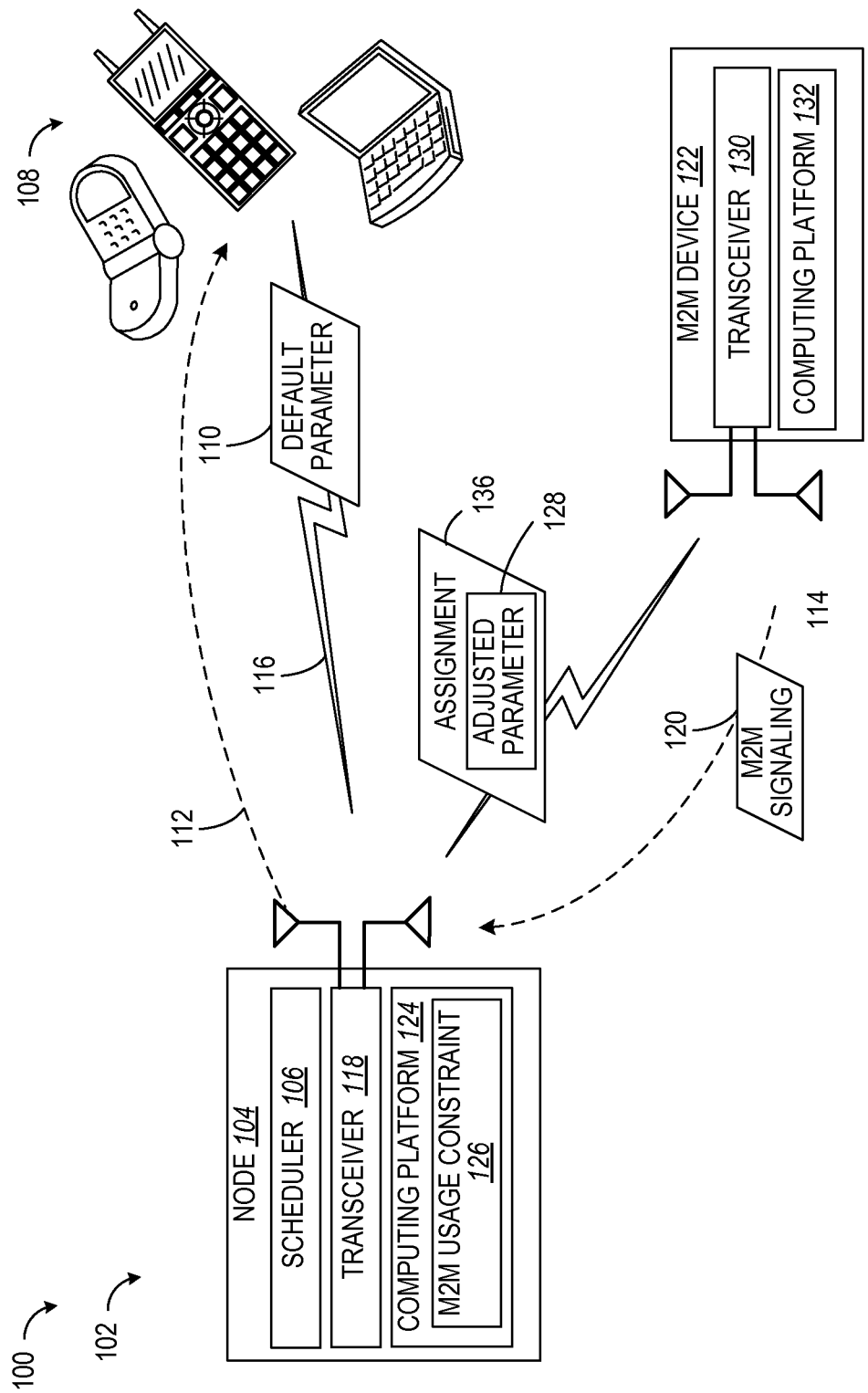
FIG. 1 illustrates a Wireless Wide Area Network (WAN) with Machine-to-Machine (M2M) indications and scheduling.

Certain aspects of the present disclosure provide signalling support for triggering appropriate network behavior towards a mobile device that requires "machine-to-machine (M2M)" services.

For support of M2M services over cellular systems, a variety of behaviors that would be beneficial to the system may be identified. As one example, there are many M2M use cases where battery life is critical, leading to such suggested optimisations as extremely low-activity discontinuous reception (DRX) or discontinuous transmission (DTX) cycles for M2M devices. Other use cases may or may not have such constraints on battery life, but instead or in addition may be suited to other features or behaviours beneficial to M2M operations.

A large proportion of the proposed behaviors for M2M devices involve both a mobile device and a serving network. In the case of a long DRX cycle, the network may need to be aware that it should configure the longer cycle. For example, in the 3GPP systems, the network may always have absolute control of the DRX configuration of a connected UE. The network should be aware of the configuration of the mobile device, so it knows when it can transmit to the mobile device. For such behaviors to be possible there should be some indication to the network of when a device, or a particular service involving a device, is involved in M2M activity for which the behavior would be appropriate.

For certain aspects of the present disclosure, the M2M "characteristic" could be considered either as per-service or per-device. An example of the former might be a device embedded in a car, most of whose cellular usage is devoted to transferring small amounts of telemetry-type data, but the device may occasionally be used for voice traffic, such as an emergency call. An example of the latter could be a sensor, vending machine, or other single-purpose devices that use cellular services only for M2M activities.

For certain aspects, if a device is entirely devoted to M2M functionality, it does not need any particular granularity in indicating its status. At the time that the device first attaches to the core network, for instance, the device may indicate that it is an M2M device, with the indication persisting and affecting behavior of the network for as long as the device remains attached to the same core network.

Alternatively, for certain aspects, the M2M "indicator" could be a characteristic of a permanent user profile, resident in a node in the home network of the user. If such a device attaches to a core network while roaming, the M2M indicator would need to be propagated from the home network to the visited network.

In either case, once the indicator is available to the serving core network, it may be distributed to any network node(s) that may be involved in a particular feature related to M2M functionality. For instance, in the LTE standard, where the DRX cycle of a connected UE is controlled by the serving evolved-Node B (eNode B), the M2M indicator would need to be provided to the eNode B by the core network at the time of connection establishment.

For certain aspects, when a feature resident in another node in the network is affected by the M2M status of the mobile device, the indicator would need to be delivered to that node. Various interfaces and protocols are available for this delivery, depending on what the concerned nodes are and the underlying system architecture.

For certain aspects of the present disclosure, a single mobile device may function as an M2M device for some services but not others. In this case, an M2M indicator could be associated with a service rather than with the device. Equivalently, the device could have an associated description, such as a bitmap, indicating which of its services are M2M. However, many M2M optimizations are scoped to the behavior of the entire device rather than to individual services. Therefore, it might be appropriate to have a single indicator for the device, but also to have the ability to change the value of this indicator based on the current service status.

In one aspect, these changes of changing status to M2M or non-M2M for a mobile device or certain active objects on a mobile device can be dynamic. In another aspect, these changes can be described as "semi-static" rather than dynamic, as the establishment or release of a service is a high-level procedure with a fairly long duration. Optimizing network overhead can be a trade-off based upon how frequently an M2M status is updated. For instance, in practice the changes can be infrequent (e.g., at the level of minutes rather than milliseconds or even seconds).

For certain aspects, a single mobile device might have multiple services, all of which use M2M functionality, even though the device may be capable of supporting additional services not using M2M functionality. In this case, the mobile device can expect to benefit from most of the same optimizations as the "intrinsically M2M" devices already considered, and the core network should consider it as an M2M device. However, if a non-M2M service (e.g., a voice call) is established for the same device, the mobile device should be able to cease being treated as an M2M device.

For certain aspects, semi-static management of an M2M indicator requires the use of signaling originated from the mobile device towards the core network, without disrupting existing services. In the 3GPP systems, one suitable candidate for this signaling may be signaling already defined for the tracking area update procedure. However, a new procedure could also be defined for the purpose of carrying the M2M indication. More radically still, the attachment model could be revised to allow separate logical attachments to the core network, potentially with different properties, for the same mobile device.

Certain aspects provide a method for wireless communications. The method generally includes transmitting, from a mobile device to a receiving entity in a wireless network, a signaling message indicating machine-to-machine (M2M) functionality of the mobile device in the wireless network.

Certain aspects provide a method for wireless communications. The method generally includes receiving, from a mobile device in a wireless network, a signaling message indicating machine-to-machine (M2M) functionality of the mobile device in the wireless network.

Certain aspects provide an apparatus for wireless communications. The apparatus generally includes logic for transmitting, from a mobile device to a receiving entity in a wireless network, a signaling message indicating machine-to-machine (M2M) functionality of the mobile device in the wireless network.

Certain aspects provide an apparatus for wireless communications. The apparatus generally includes logic for receiving, from a mobile device in a wireless network, a signaling message indicating machine-to-machine (M2M) functionality of the mobile device in the wireless network.

Certain aspects provide an apparatus for wireless communications. The apparatus generally includes means for transmitting, from a mobile device to a receiving entity in a wireless network, a signaling message indicating machine-to-machine (M2M) functionality of the mobile device in the wireless network.

Certain aspects provide an apparatus for wireless communications. The apparatus generally includes means for receiving, from a mobile device in a wireless network, a signaling message indicating machine-to-machine (M2M) functionality of the mobile device in the wireless network.

Certain aspects provide a computer-program product for wireless communications, comprising a computer-readable medium having instructions stored thereon, the instructions being executable by one or more processors. The instructions generally include instructions for transmitting, from a mobile device to a receiving entity in a wireless network, a signaling message indicating machine-to-machine (M2M) functionality of the mobile device in the wireless network.

Certain aspects provide a computer-program product for wireless communications, comprising a computer-readable medium having instructions stored thereon, the instructions being executable by one or more processors. The instructions generally include instructions for receiving, from a mobile device in a wireless network, a signaling message indicating machine-to-machine (M2M) functionality of the mobile device in the wireless network.

Certain aspects of the present disclosure provide an apparatus for wireless communications. The apparatus generally includes at least one processor configured to transmit, from a mobile device to a receiving entity in a wireless network, a signaling message indicating machine-to-machine (M2M) functionality of the mobile device in the wireless network.

Certain aspects of the present disclosure provide an apparatus for wireless communications. The apparatus generally includes at least one processor configured to receive, from a mobile device in a wireless network, a signaling message indicating machine-to-machine (M2M) functionality of the mobile device in the wireless network.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Referring to FIG. 1, in a communication system 100 including a Wireless Wide Area Network (WWAN) 102, a network apparatus (e.g., base node, base station, access network etc.) 104 has a scheduler 106 for serving a population of devices (e.g., handsets, User Equipment (UE) mobile devices, access terminals, etc.) 108 for the WWAN 102 by assigning a default parameter 110 for resource allocation of an Uplink (UL) 112 or Downlink (UL) 114 of an airlink 116. A transceiver 118 receives a first signaling message 120 indicating machine-to-machine (M2M) functionality from a first device 122 of the population of devices 108. A computing platform 124 determines a first usage constraint 126 associated with the M2M functionality. The scheduler 106 assigns an adjusted parameter 128 for resource allocation of the airlink 116 for the first device 122 that complies with the first usage constraint 126.

Correspondingly for the first device 122, a transceiver 130 acquires service from the network apparatus (node) 104, which can include receiving the default parameter 110 for assignment of resource allocation of the airlink 116 as appropriate for non-M2M devices. A computing platform 132 via the transceiver 130 transmits the first signaling message 120 providing indicating M2M functionality to the node 104. The transceiver 130 receives an assignment 136 of the adjusted parameter 128 for resource allocation of the airlink 116 for the first device 122 that complies with the first usage constraint 126 associated with the M2M functionality.

Figure 2:
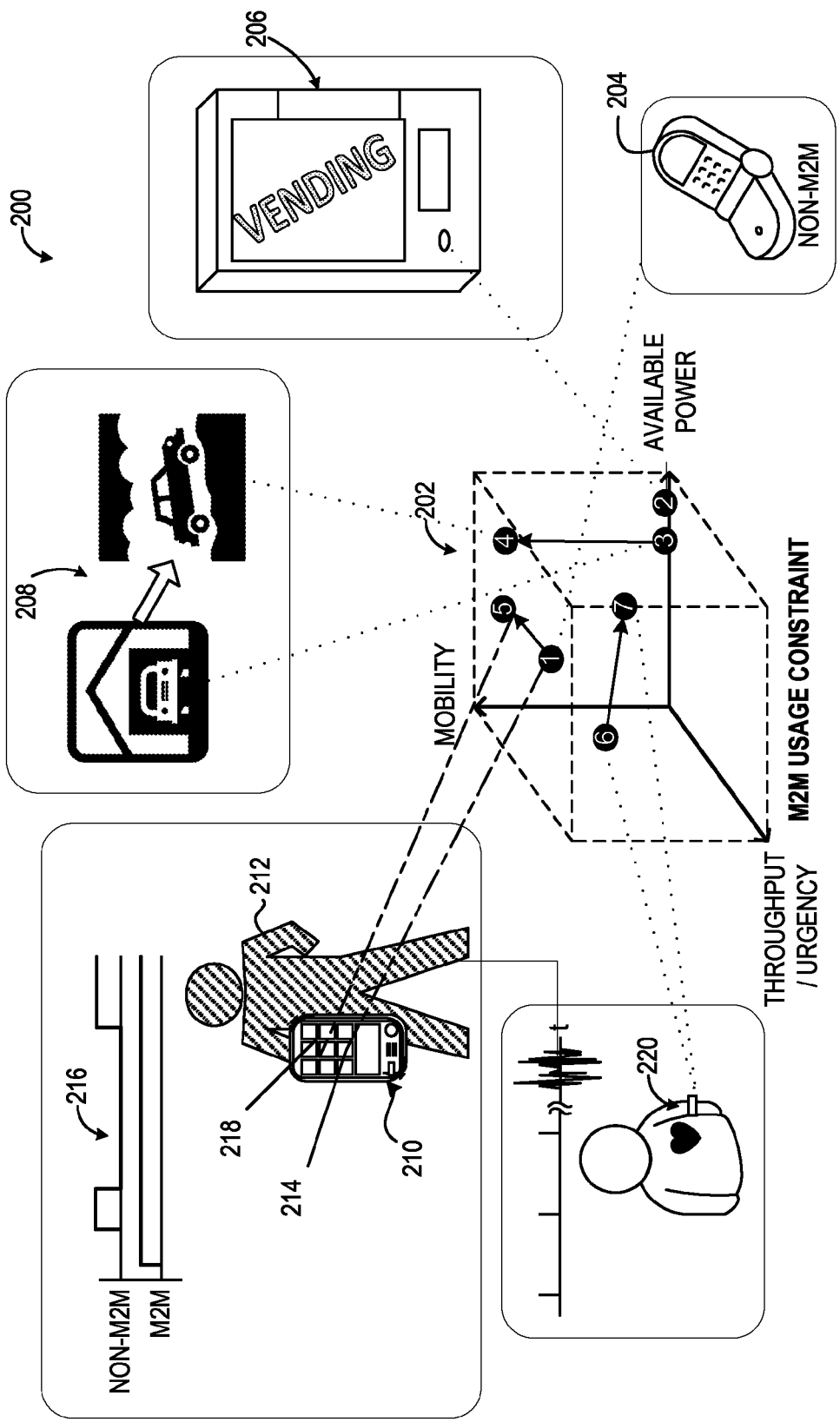
FIG. 2 illustrates an exemplary group of M2M devices with different usage constraints.

In FIG. 2, an illustrative population of devices 200 have disparate and varying usage constraints, as graphically depicted in a usage space 202. For clarity, only three M2M dimensions (functionality) are plotted for power constraint, data throughput or urgency requirements, and mobility.

First, a non-M2M device (e.g., mobile phone) 204 can have usage requirements that are the default for a WWAN, depicted at "1" in the usage space 202, wherein the non-M2M device 204 is assumed to be mobile, to have moderate available power constraints and data throughput needs that are typical for circuit switched or packet switched user equipment.

Second, an institutional M2M device (e.g., security system, system status reporting, etc.) 206 can have a M2M functionality depicted at "2" in the usage space 202 with minimal mobility, essentially unlimited power, and generally a minimal data frequency/throughput. For example, a vending system can report in as a function of seconds, minutes, or hours as to operating status (i.e., operable or inoperable) and inventory remaining. For another example, a security system can report as to whether unlimited power is available or whether on battery backup and as to whether a break-in is detected. The latter could initiate a change in M2M usage requirements wherein one direction or bi-directional video or audio is streamed. Paging in order to select the strongest node is not required or required only infrequently due to the lack of mobility of the institutional M2M device 206.

Third, a mobile M2M device (e.g., diagnostic/tracking automotive system) 208 can have M2M functionality that has a changing usage constraint, depicted initially at "3" in the usage space 202 wherein the mobile M2M device 208 is in a passive state. For example, a vehicle is parked with the engine not running During certain intervals, the mobile M2M device 208 is in an active state wherein the amount of reporting or the paging needed to maintain session continuity changes to a different usage state, depicted at "4" in the usage space 202.

Fourth, a multipurpose M2M device (e.g., smartphone, 3G/4G capable laptop or notepad computer, etc.) 210 can have one or more M2M objects and one or more non-M2M objects. At any given times, the M2M functionality can change depending upon the situation. For example, a user 212 can use the multipurpose M2M device 210 for a non-M2M object 214 (e.g., voice or multimedia communication) wherein the device 210 at least partially reverts to a non-M2M mode as depicted at 216. For example, the default usage constraint can be at "1" in the usage space 202 for a non-M2M device 204. For another example, one or more M2M objects 218 can require a usage constraint for M2M functionality during certain intervals or in conjunction with the non-M2M objects 214. In an illustrative scenario, the device 210 as a function of time changes to an M2M usage constraint as depicted at "5" in the usage space 202, with purposes a lower data interval frequency and throughput.

Fifth, an M2M device 220 can have two M2M usage constraints depicted at "6" and "7" in the usage space 202. For example, a health monitoring device can have a steady state usage condition wherein preserving power is the dominant consideration in order to increase service life. When a critical condition is detected, then the priority changes to sending urgent and higher bandwidth data without regard to conserving power.

Figure 3:
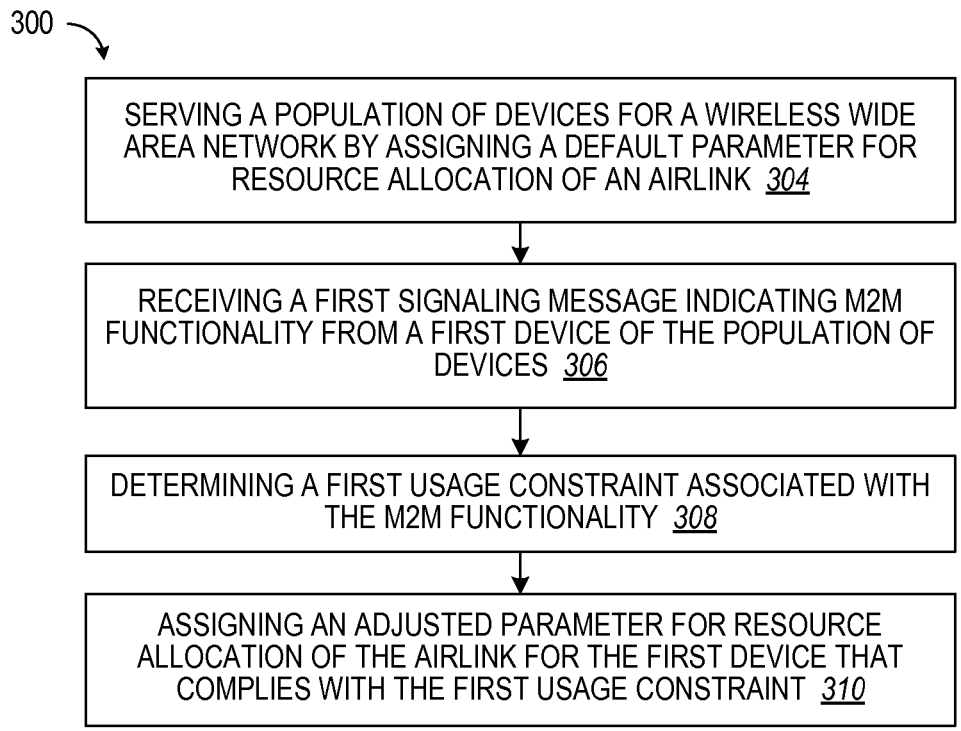
FIG. 3 illustrates a flow diagram for a methodology for a node to perform WWAN scheduling responsive to M2M indications.

In FIG. 3, a methodology 300 or sequence of operations is depicted for a node to perform wireless communication. The node serves a population of devices for a wireless wide area network by assigning a default parameter for resource allocation of an airlink (block 304). The node receives a first signaling message indicating machine-to-machine (M2M) functionality from a first device of the population of devices (block 306). The node determines a first usage constraint associated with the M2M functionality (block 308). The node assigns an adjusted parameter for resource allocation of the airlink for the first device that complies with the first usage constraint (block 310).

Figure 4:
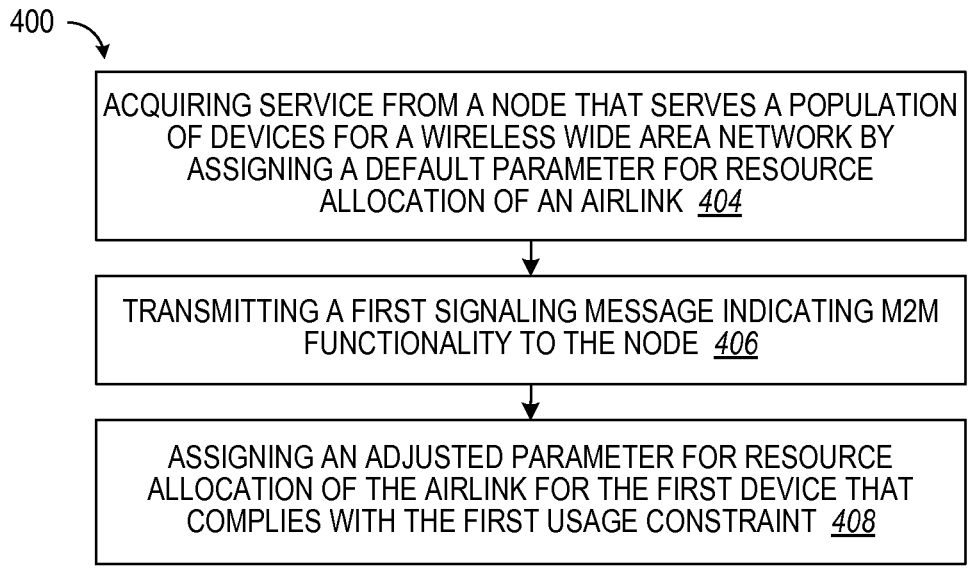
FIG. 4 illustrates a flow diagram for a methodology for a mobile device to indicate and receive scheduling in a WWAN appropriate for M2M functionality.

In FIG. 4, a methodology 400 or sequence of operations is depicted for a first device (e.g., access terminal) to perform wireless communication with a node. The device acquires service from a node that serves a population of devices for a WWAN, at least a subset of which are being assigned a default parameter for resource allocation of an airlink (block 404). The first device transmits a first signaling message indicating M2M functionality to the node (block 406). The first device receives an assignment of an adjusted parameter for resource allocation of the airlink that complies with a first usage constraint associated with the M2M functionality (block 408).

Figure 5:
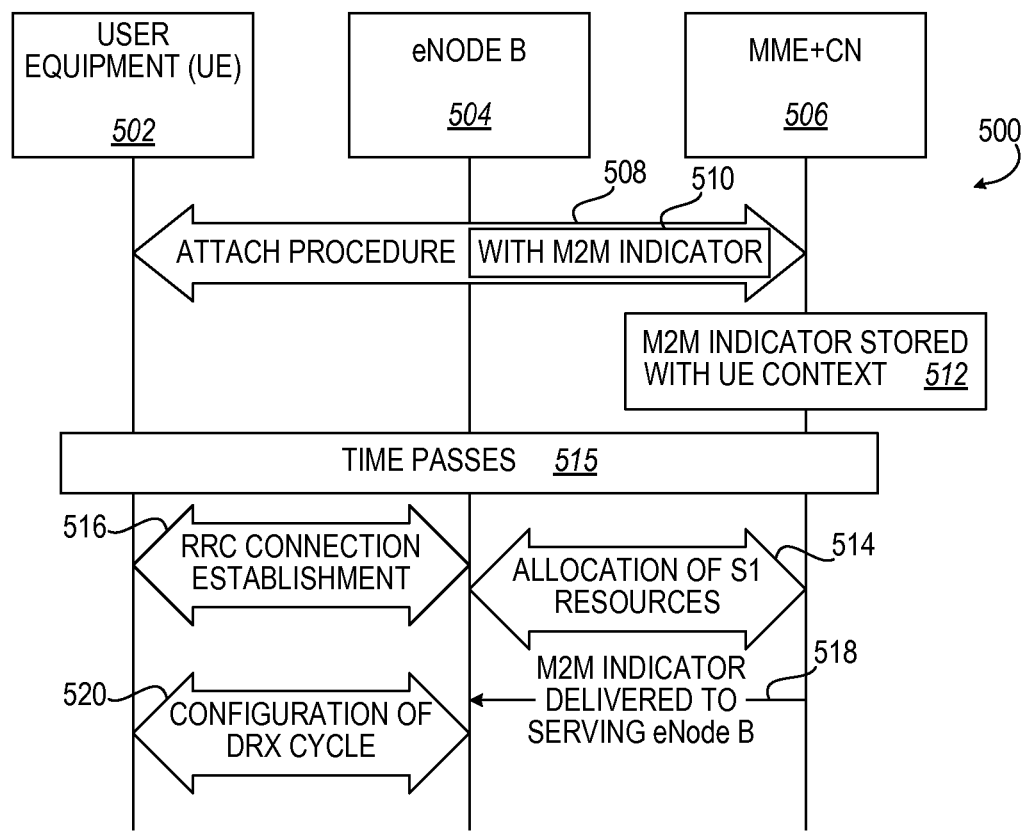
FIG. 5 illustrates an example of M2M indicator delivery to an evolved-Node B (eNode B) at radio resource control (RRC) connection time, in accordance with certain aspects of the present disclosure.

FIG. 5 illustrates an example 500 of M2M indicator delivery to eNode B at radio resource control (RRC) connection time, in accordance with certain aspects of the present disclosure. The M2M indicator from UE 502 is provided to the mobility management entity (MME) 504, and hence to the core network (CN) (shown as a single "MME+CN" 506 box in the figure) as part of the initial attachment procedure 508. For certain aspects, the M2M indicator could instead be retrieved from the home network of the UE 502 as part of a persistent user profile, e.g., stored in the home subscriber server (HSS).

When the UE 502 connects to an eNode B 504, or if the network determines to keep the UE 502 in connected mode following the attach procedure 508, the MME 506 can indicate 510 to the eNode B 504 that the UE 502 is an M2M device. The M2M indicator is stored with UE context at the MME+CN 506 (block 512). The M2M indication is associated with the allocation of S1 resources (block 514). Time can pass until the M2M becomes active (block 515). The S1 allocation is a convenient trigger, since it is the first procedure in which the MME 506 becomes aware of the ongoing RRC connection establishment (block 516) between the UE 502 and the eNode B 504. The indicator may also be provided to the eNode B 504 at any point thereafter (block 518). The eNodeB 504 can utilize the M2M indicator for purposes such as configuring a discontinuous reception (DRX) cycle (block 520).

Figure 6:
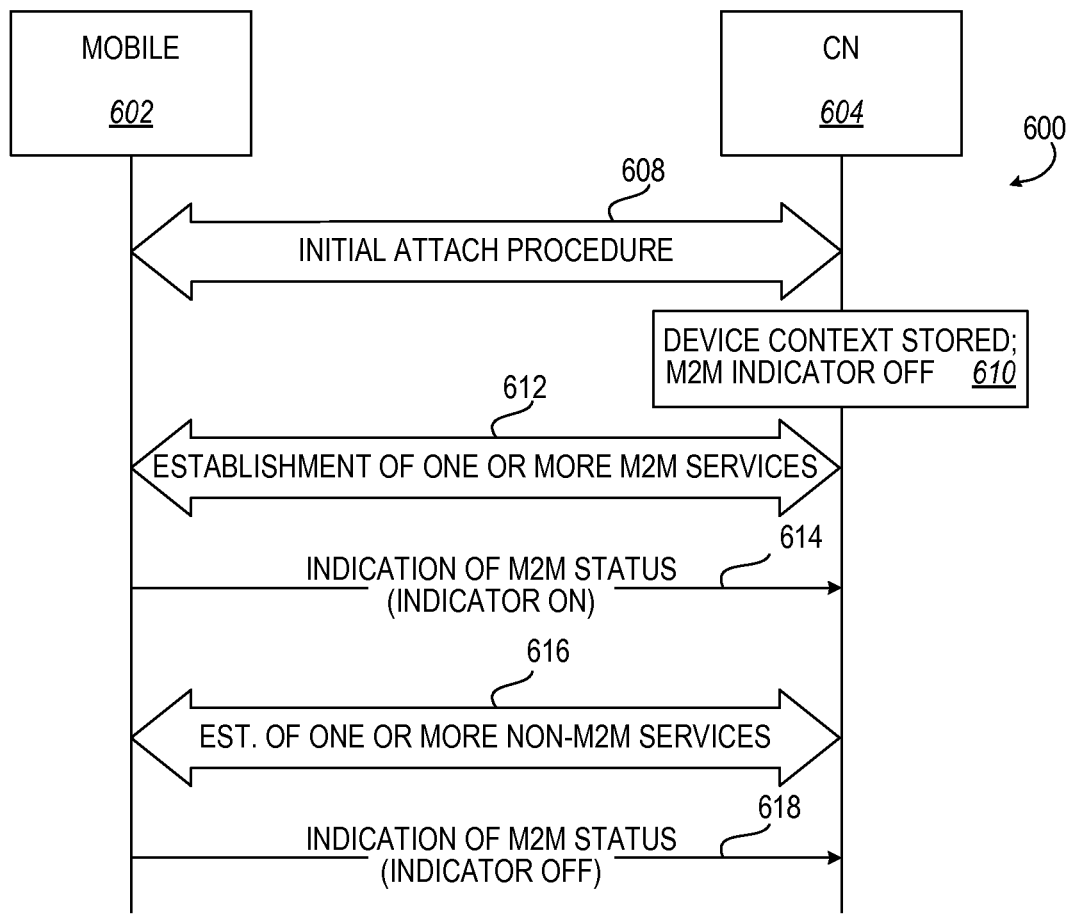
FIG. 6 illustrates an example of updating M2M indicator based on types of services, in accordance with certain aspects of the present disclosure.

FIG. 6 illustrates an example 600 between a mobile device 602 and core network (CN) 604 of updating the value of an M2M indicator based on the active services, in accordance with certain aspects of the present disclosure. It should be noted that the terminology in FIG. 6 is intended to be agnostic to a particular technology. For example, in a 3GPP system, the messages labeled "Indication of M2M status" 606 might be tracking area update messages directed from the mobile device (or UE) 602 to the serving MME (not shown), with the indicator either stored at the MME or delivered further to some node in the core network 604. As illustrated, a mobile device may always attach 602 to the core network as a device that does not support M2M functionality (i.e., a non-M2M device) (block 608). The CN 604 stores the device context as M2M indicator is off (block 610).

The mobile device may establish one or more M2M services 612 with the core network 604. The mobile device 602 may indicate its M2M status via a message 614 such as the tracking area update whenever it detects that all of its services are M2M. The tracking area update procedure is the lowest-impact approach to introducing a semi-static indicator. The M2M status update may cause the network to begin treating the mobile device as an M2M device. Addition of a non-M2M service 616 may cause another M2M status update message 618 to change the value of the indicator, so that the network no longer applies M2M-specific behaviors towards the mobile.

For certain aspects, the M2M indicator could be delivered separately for each service, as part of the establishment procedure. Therefore, the core network could store the indicator separately for each service (equivalently, the core network could maintain a map of per-service indicator values associated with the device context). For M2M behaviors that can meaningfully be applied on a per-service basis, the indicator for the appropriate service could then be provided to the network node responsible for maintaining the corresponding functionality. However, the majority of M2M support enhancements currently identified apply to an entire device (e.g., the DRX cycle, which generally applies to the entire device rather than to a particular service). If the device indicates per-service M2M status, the core network would be responsible for determining from the aggregated indicators for services towards a particular device whether the device was functioning as an M2M device.

For certain aspects, the M2M indicator may be a boolean indicator of status. Therefore, a device, or a service, may be indicated as either M2M or not. However, there may be different classes of M2M services (which may or may not be formally classified by a specification) with different optimisations being applicable. For instance, a medical sensor may benefit from battery-saving optimisations such as a lengthened DRX cycle, but not be restricted in its mobility, while a vending machine should generally have no need for aggressive power conservation but can almost certainly be assumed to have low mobility. For such cases, there may be benefits in indicating either a particular service/device class or the particular behaviors that the device expects to benefit from.

For certain aspects, a device that requires battery saving optimizations and high mobility, such as a medical sensor could identify itself as "M2M with battery restrictions and high mobility", while a device without power limitations with low mobility such as a vending machine could identify itself as "M2M with low mobility and without battery restrictions". These descriptions could either relate to a group of pre-identified classes or to separate flags for each characteristic; and as described above, they could relate either to the device or to a particular service.

Figure 7:
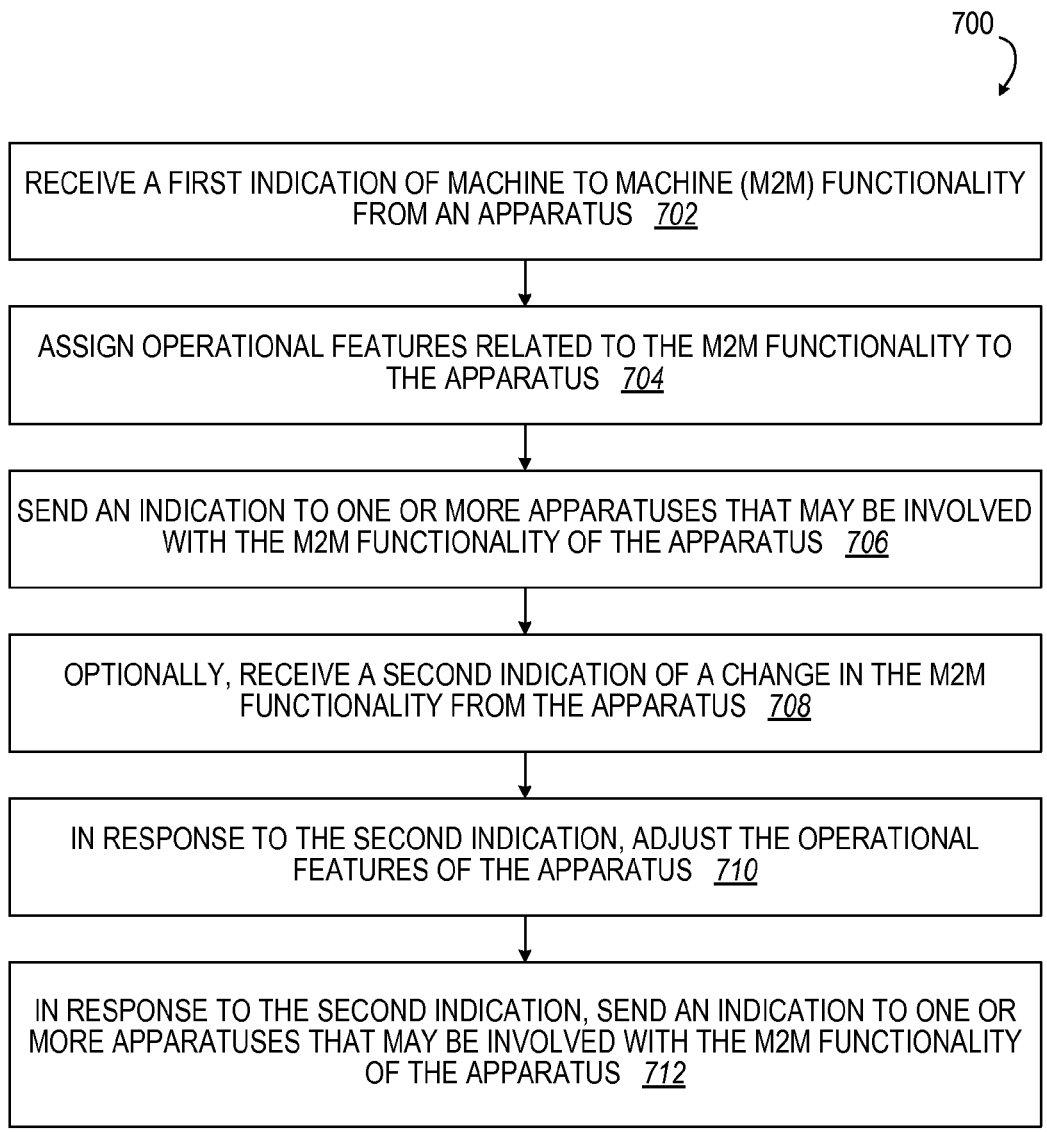
FIG. 7 illustrates example network-side operations for identifying machine to machine devices and services, in accordance with certain aspects of the present disclosure.

FIG. 7 illustrates example network-side operations for identifying machine to machine devices and services, in accordance with certain aspects of the present disclosure. At 702, a first indication of machine to machine (M2M) functionality is received from an apparatus. At 704, operational features related to the M2M functionality are assigned to the apparatus. For example, if all of the services in the apparatus are M2M, the apparatus may be considered as an M2M device. At 706, an indication is sent to one or more apparatuses that may be involved with the M2M functionality of the apparatus. For example, the indicator may report the status of the device as being an M2M device or not. At 708, optionally, a second indication of a change in the M2M functionality is received from the apparatus. For example, the change in the status of the apparatus may be as a result of initiation or stop of a service that required non-M2M functionality. At 710, in response to the second indication, the operational features of the apparatus are adjusted. At 712, in response to the second indication, an indication is sent to one or more apparatuses that may be involved with the M2M functionality of the apparatus.

Figure 8:
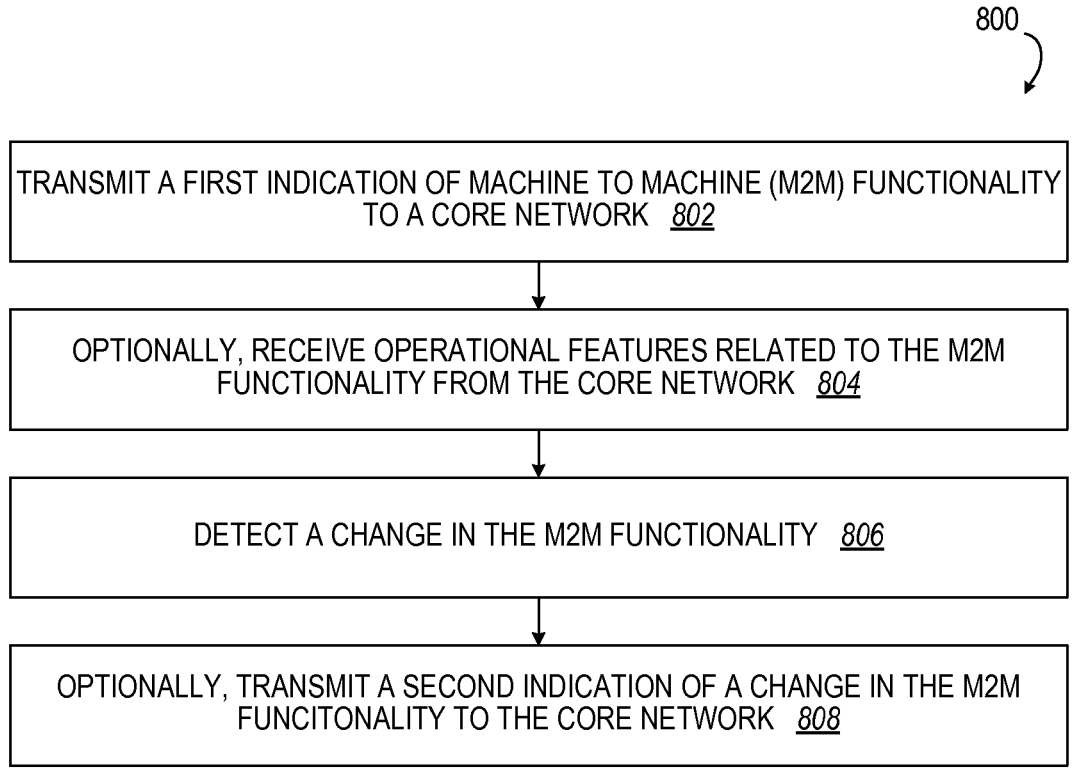
FIG. 8 illustrates example components capable of performing the operations illustrated in FIG. 7.

FIG. 8 illustrates example transmitter-side operations for identifying machine to machine devices and services, in accordance with certain aspects of the present disclosure. At 802, a first indication of M2M functionality is transmitted to a core network. For example, an apparatus may indicate that it is an M2M device if all of its services are M2M services. Or, the apparatus may indicate the M2M status of each specific service to the core network. At 804, operational features related to the M2M functionality are optionally received from the core network. At 806, a change in the M2M functionality is detected, as a result of an initiation or stop of a non-M2M service. At 808, a second indication of the change in the M2M functionality is optionally transmitted to the core network.

Certain aspects of the present disclosure provided methods to identify a mobile device that requires M2M functionality and trigger appropriate network behaviors towards the mobile device.

Figure 9:
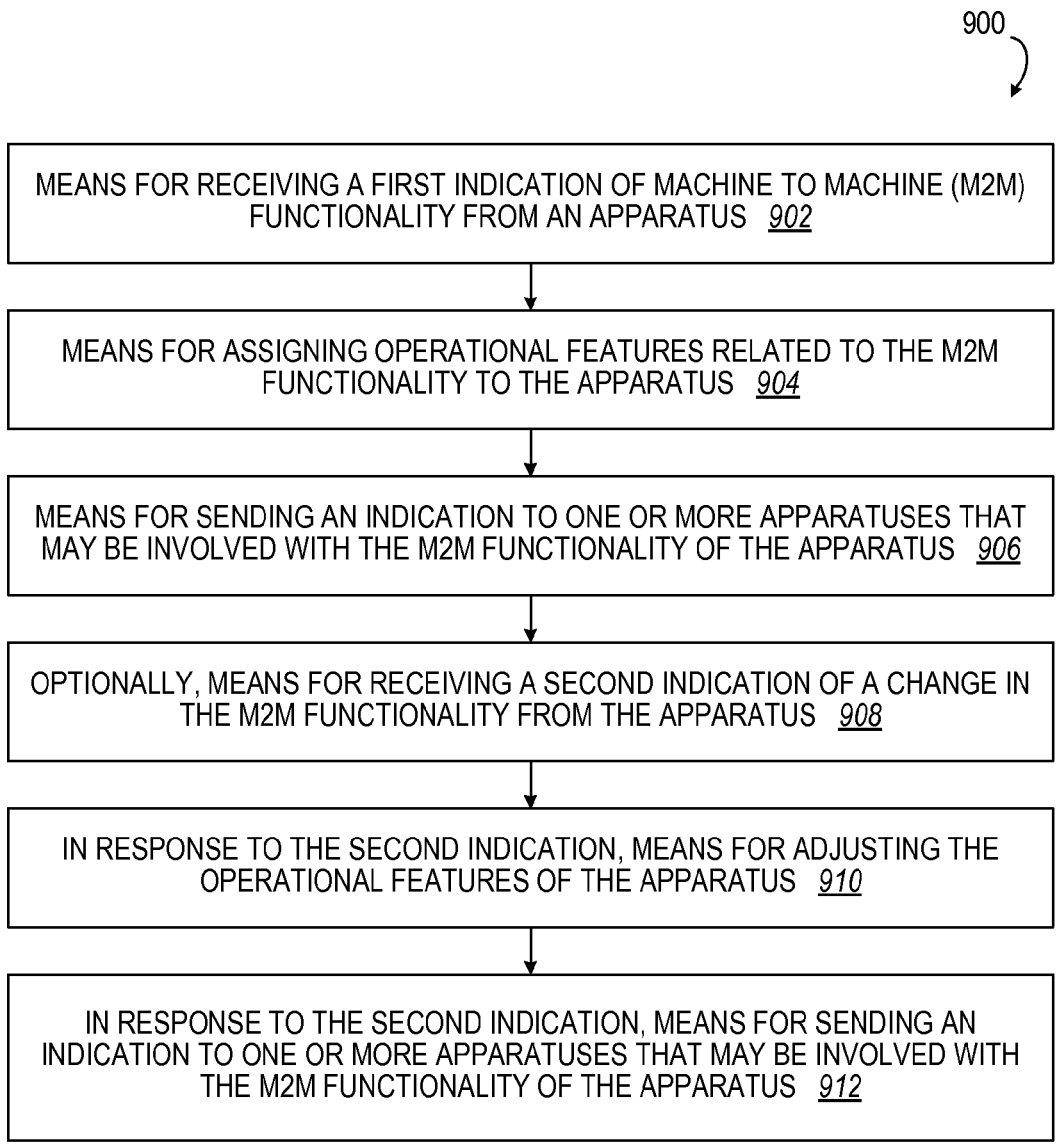
FIG. 9 illustrates example transmitter-side operations for identifying machine to machine devices and services, in accordance with certain aspects of the present disclosure.

The various operations of methods described above may be performed by various hardware and/or software component(s) and/or module(s) corresponding to means-plus-function blocks illustrated in the Figures. FIG. 9 illustrates a network apparatus 900 for performing exemplary network-side operations for identifying machine to machine devices and services, in accordance with certain aspects of the present disclosure. At 902, the network apparatus 900 comprises means for receiving a first indication of machine to machine (M2M) functionality from an apparatus. At 904, the network apparatus 900 comprises means for assigning operational features related to the M2M functionality to the apparatus. For example, if all of the services in the apparatus are M2M, the apparatus may be considered as an M2M device. At 906, the network apparatus 900 comprises means for sending an indication to one or more apparatuses that may be involved with the M2M functionality of the apparatus. For example, the indicator may report the status of the device as being an M2M device or not. At 908, the network apparatus 900 comprises means for optionally receiving a second indication of a change in the M2M functionality from the apparatus. For example, the change in the status of the apparatus may be as a result of initiation or stop of a service that required non-M2M functionality. At 910, the network apparatus 900 comprises means for adjusting the operational features of the apparatus in response to the second indication. At 912, the network apparatus 900 comprises means for sending an indication to one or more apparatuses that may be involved with the M2M functionality of the apparatus in response to the second indication.

Figure 10:
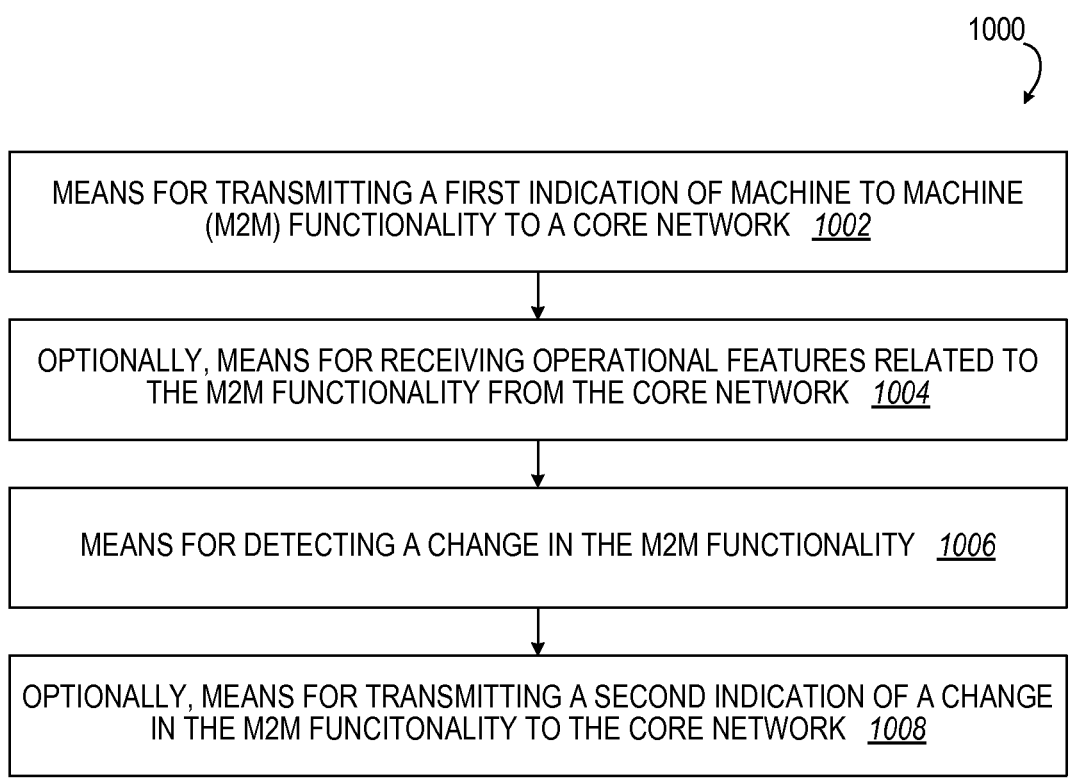
FIG. 10 illustrates example components capable of performing the operations illustrated in FIG. 9.

FIG. 10 illustrates an apparatus 1000 for performing exemplary transmitter-side operations for identifying machine to machine devices and services, in accordance with certain aspects of the present disclosure. At 1002, the apparatus 1000 comprises means for transmitting a first indication of M2M functionality to a core network. For example, the apparatus may indicate that it is an M2M device if all of its services are M2M services. Or, the apparatus 1000 may indicate the M2M status of each specific service to the core network. At 1004, the apparatus 1000 comprises means for optionally receiving operational features related to the M2M functionality from the core network. At 1006, the apparatus 1000 comprises means for detecting a change in the M2M functionality as a result of an initiation or stop of a non-M2M service. At 1008, the apparatus 1000 comprises means for optionally transmitting a second indication of the change in the M2M functionality to the core network.

Figure 11:
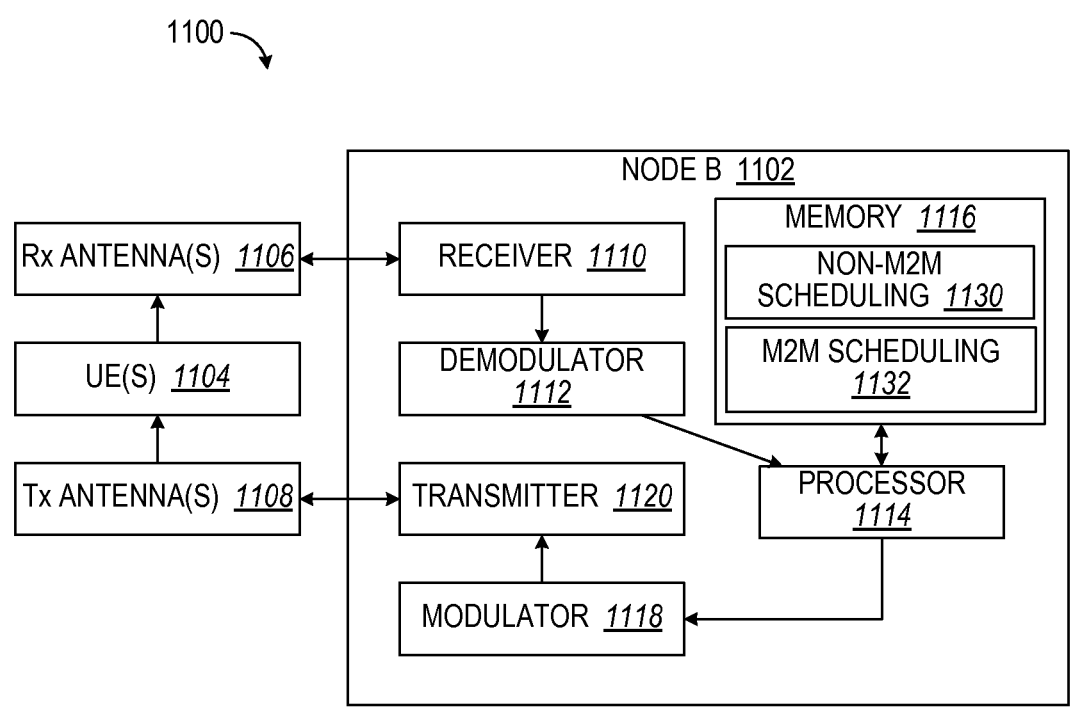
FIG. 11 illustrates a schematic diagram of a Node B capable of performing non-M2M and M2M scheduling.

FIG. 11 is a block diagram of a system 1100 that can be utilized to implement various aspects of the functionality described herein. In one example, system 1100 includes a base station or Node B 1102. As illustrated, Node B 1102 can receive signal(s) from one or more UEs 1104 via one or more receive (Rx) antennas 1106 and transmit to the one or more UEs 1104 via one or more transmit (Tx) antennas 1108. Additionally, Node B 1102 can comprise a receiver 1110 that receives information from receive antenna(s) 1106. In one example, the receiver 1110 can be operatively associated with a demodulator 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. In one example, Node B 1102 can also include a modulator 1118 that can multiplex a signal for transmission by a transmitter 1120 through transmit antenna(s) 1108. The memory 1116 stores non-M2M scheduling component 1130 and M2M scheduling component 1132 that when executed by processor 1114 cause respective scheduling at a default parameter for airlink assignment for non-M2M served devices and an adjusted parameter for airlink assignment for M2M served devices.

Figure 12:
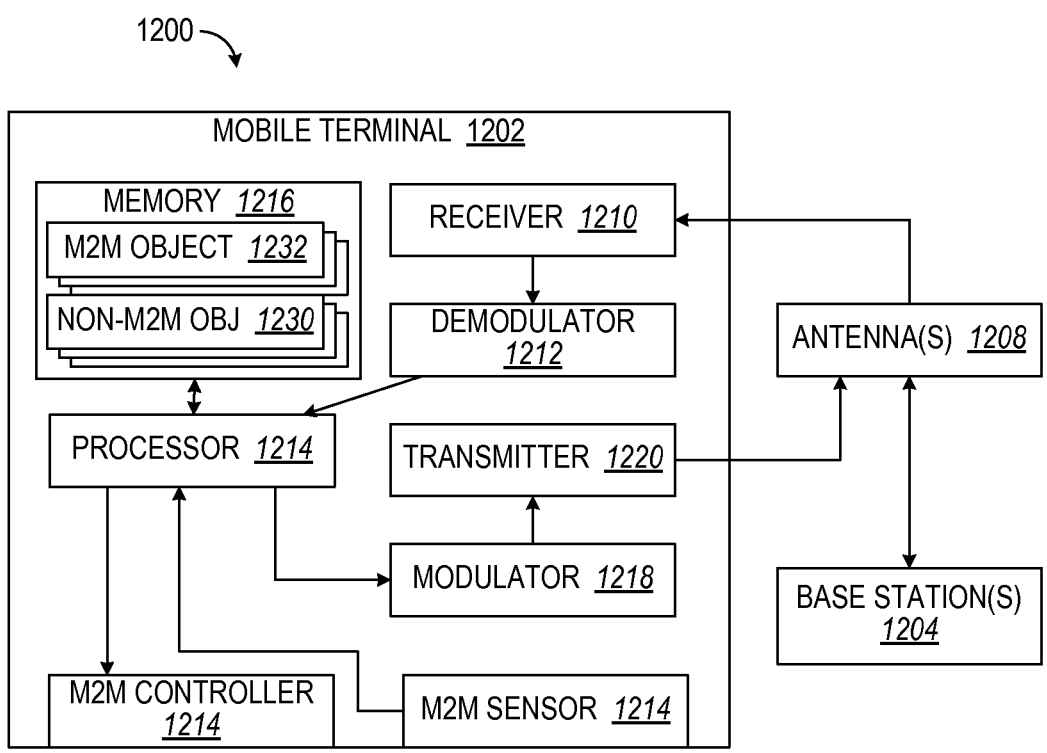
FIG. 12 illustrates a schematic diagram of a mobile device capable of requesting scheduling for non-M2M and M2M objects.

FIG. 12 is a block diagram of another system 1200 that can be utilized to implement various aspects of the functionality described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodologies described herein. Mobile terminal 1202 can also include a modulator 1218 that can multiplex a signal for transmission by a transmitter 1220 through antenna(s) 1208. The memory 1216 stores non-M2M scheduled objects 1230 and M2M scheduled objects 1232 that when executed by processor 1214 prompt respective scheduling at a default parameter nd adjusted parameter for airlink assignment devices.

Figure 13:
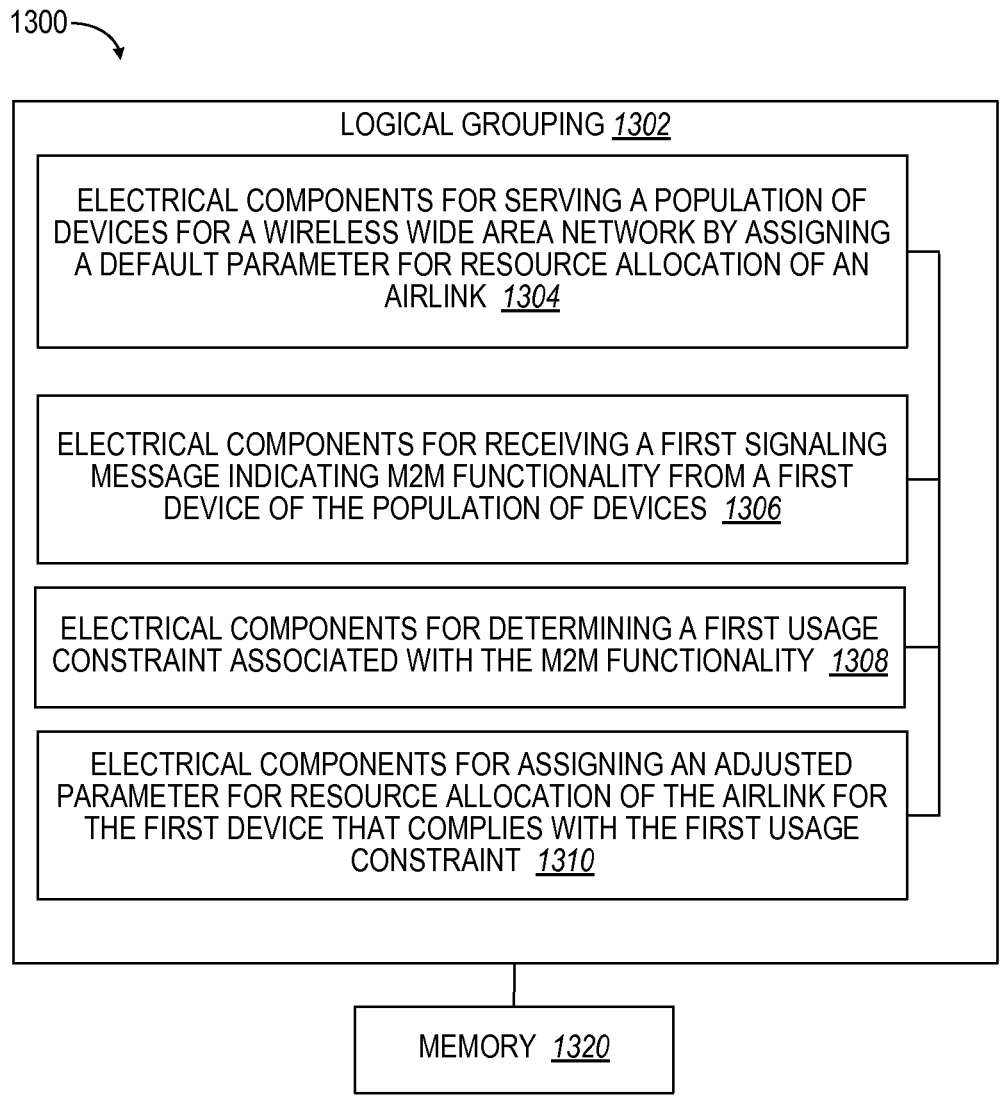
FIG. 13 illustrates a schematic diagram of an apparatus comprising logical grouping of electrical components for requesting scheduling for non-M2M and M2M objects.

With reference to FIG. 13, illustrated is a system 1300 for wireless communication. For example, system 1300 can reside at least partially within a network entity (e.g., evolved base node). It is to be appreciated that system 1300 is represented as including functional blocks, which can be functional blocks that represent functions implemented by a computing platform, processor, software, or combination thereof (e.g., firmware). System 1300 includes a logical grouping 1302 of electrical components that can act in conjunction. For instance, logical grouping 1302 can include an electrical component 1304 for serving a population of devices for a wireless wide area network by assigning a default parameter for resource allocation of an airlink. Moreover, logical grouping 1302 can include an electrical component 1306 for receiving a first signaling message indicating machine-to-machine (M2M) functionality from a first device of the population of devices. Further, logical grouping 1302 can include an electrical component 1308 for determining a first usage constraint associated with the M2M functionality. Logical grouping 1302 can include an electrical component 1310 for assigning an adjusted parameter for resource allocation of the airlink for the first device that complies with the first usage constraint. Additionally, system 1300 can include a memory 1320 that retains instructions for executing functions associated with electrical components 1304-1310. While shown as being external to memory 1320, it is to be understood that one or more of electrical components 1304-1310 can exist within memory 1320.

Figure 14:
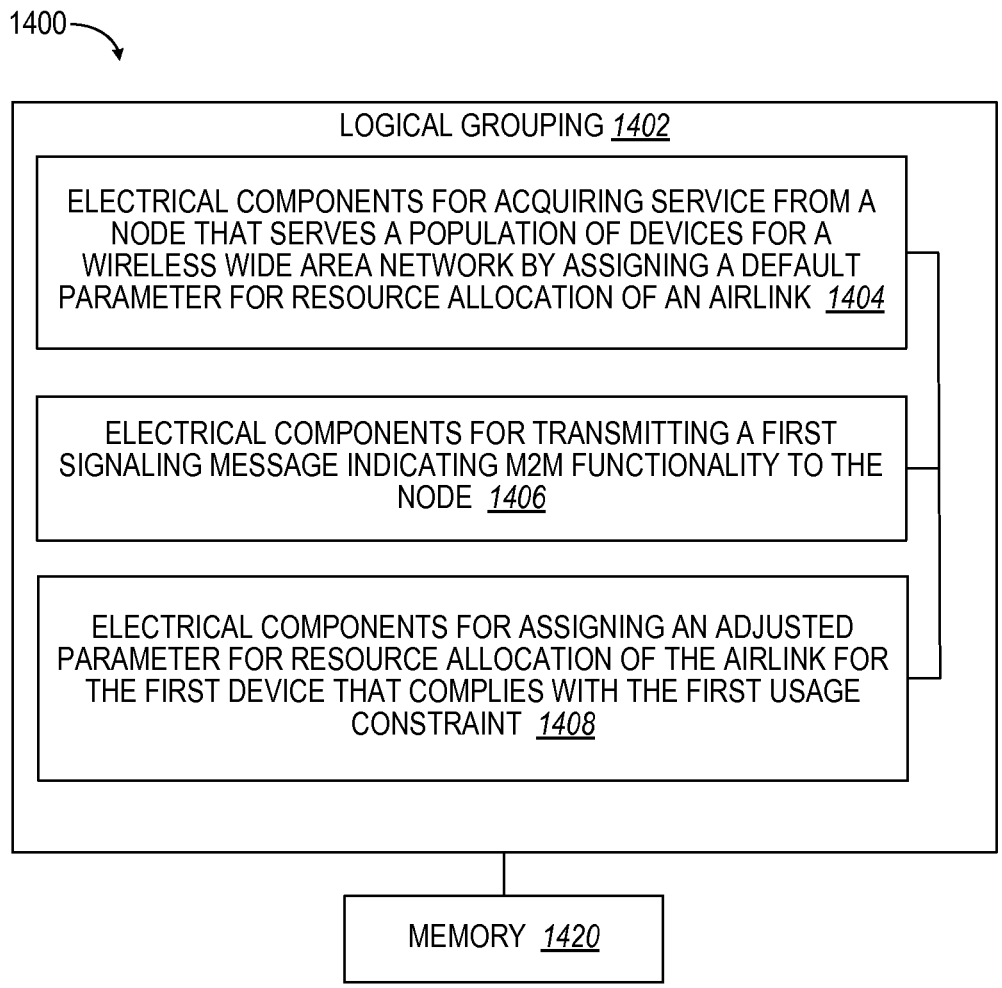
FIG. 14 illustrates a schematic diagram of a mobile device capable of requesting scheduling for non-M2M and M2M objects.

With reference to FIG. 14, illustrated is a system 1400 for wireless communication. For example, system 1400 can reside at least partially within user equipment (UE). It is to be appreciated that system 1400 is represented as including functional blocks, which can be functional blocks that represent functions implemented by a computing platform, processor, software, or combination thereof (e.g., firmware). System 1400 includes a logical grouping 1402 of electrical components that can act in conjunction. For instance, logical grouping 1402 can include an electrical component 1404 for acquiring service from a node that serves a population of devices for a wireless wide area network by assigning a default parameter for resource allocation of an airlink. Moreover, logical grouping 1402 can include an electrical component 1406 for transmitting a first signaling message indicating machine-to-machine (M2M) functionality to the node. Further, logical grouping 1402 can include an electrical component 1408 for receiving an assignment of an adjusted parameter for resource allocation of the airlink for a first device that complies with a first usage constraint associated with the M2M functionality. Additionally, system 1400 can include a memory 1420 that retains instructions for executing functions associated with electrical components 1404-1408. While shown as being external to memory 1420, it is to be understood that one or more of electrical components 1404-1408 can exist within memory 1420.

Figure 15:
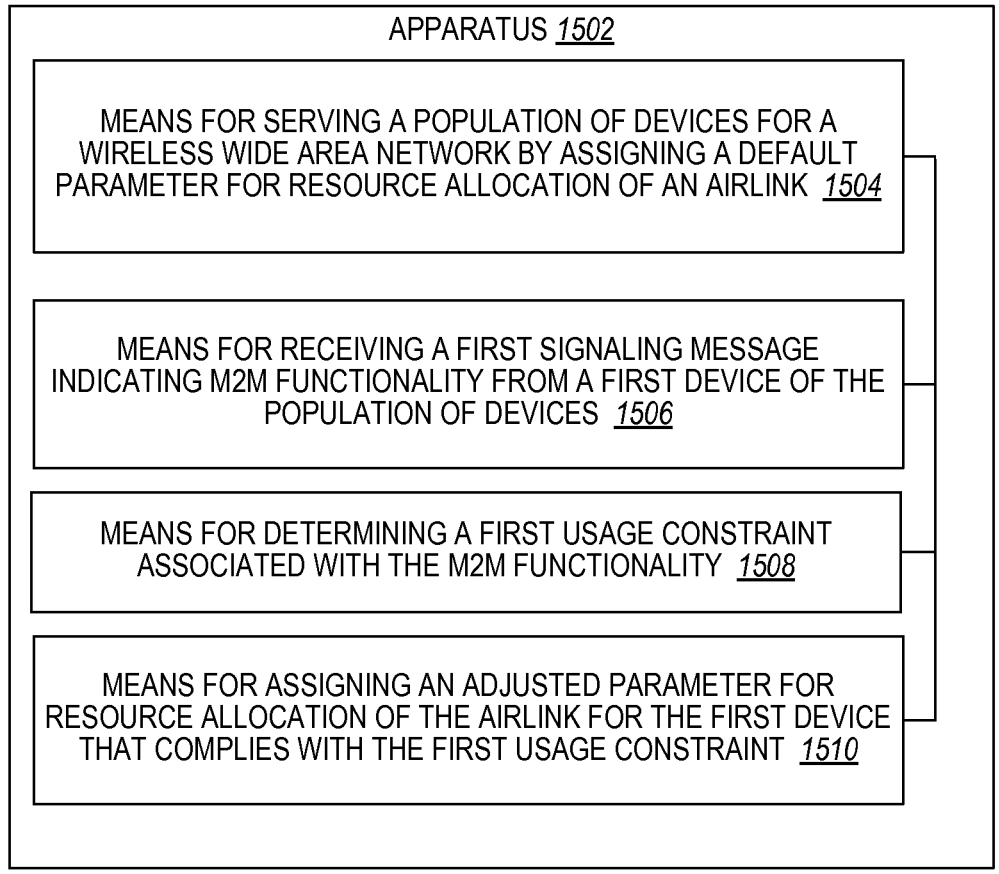
FIG. 15 illustrates a schematic diagram of an apparatus having means for performing non-M2M and M2M scheduling.

In FIG. 15, an apparatus 1502 is depicted for wireless communication. The apparatus 1502 comprises means 1504 for serving a population of devices for a wireless wide area network by assigning a default parameter for resource allocation of an airlink. The apparatus 1502 comprises means 1506 for receiving a first signaling message indicating machine-to-machine (M2M) functionality from a first device of the population of devices. The apparatus 1502 comprises means 1508 for determining a first usage constraint associated with the M2M functionality. The apparatus 1502 comprises means 1510 for assigning an adjusted parameter for resource allocation of the airlink for the first device that complies with the first usage constraint.

Figure 16:
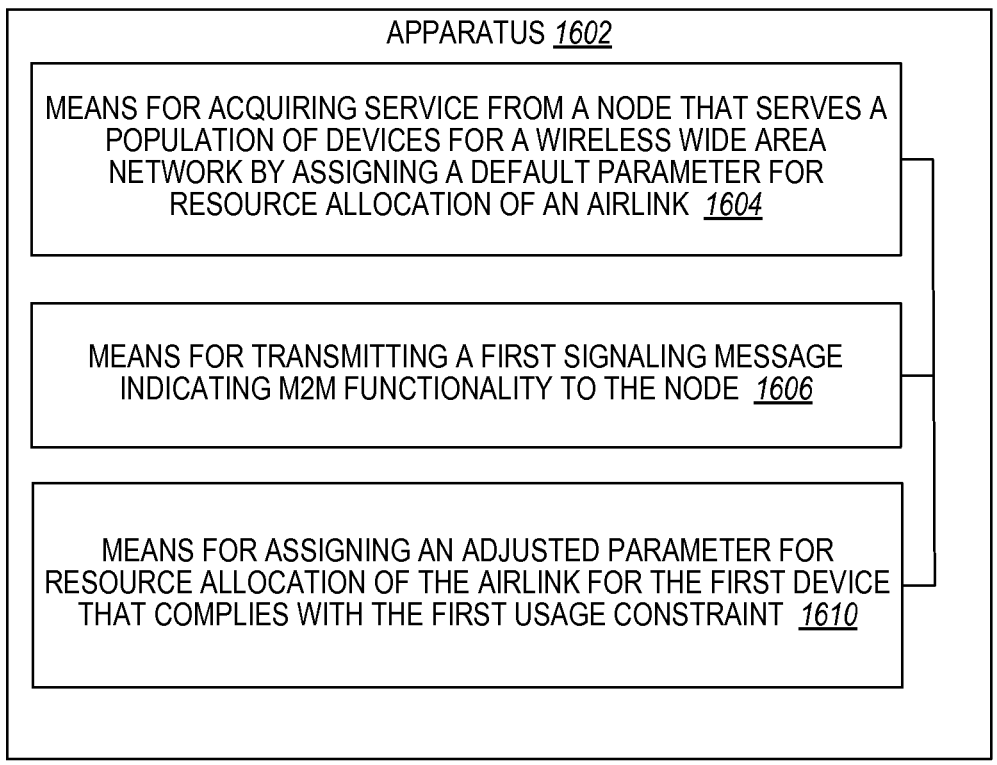
FIG. 16 illustrates a schematic diagram of an apparatus having means for requesting scheduling for non-M2M and M2M objects.

In FIG. 16, an apparatus 1602 is depicted for wireless communication. The apparatus 1602 comprises means 1604 for acquiring service from a node that serves a population of devices for a wireless wide area network by assigning a default parameter for resource allocation of an airlink. The apparatus 1602 comprises means 1606 for transmitting a first signaling message indicating machine-to-machine (M2M) functionality to the node. The apparatus 1602 comprises means 1608 for receiving an assignment of an adjusted parameter for resource allocation of the airlink for a first device that complies with a first usage constraint associated with the M2M functionality.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communication, comprising:
   receiving, at a network apparatus of a network, a first signaling message from a first device, wherein the first signaling message includes a machine-to-machine (M2M) indicator having a boolean flag value that is changeable between multiple values, the multiple values including a first value and a second value, the first value indicating an M2M functionality for a service of the first device, the second value indicating a non-M2M functionality for the service;
   determining a first usage constraint associated with the service based on the value of the M2M indicator, wherein the determining further comprises accessing subscription data from a home network via a core network; and
   assigning a parameter for resource allocation of an airlink for providing the service to the first device that complies with the first usage constraint.

2. The method of claim 1, wherein determining the first usage constraint further comprises determining a mobility characteristic associated with the M2M functionality.

3. The method of claim 1, wherein determining the first usage constraint further comprises determining a power characteristic associated with the M2M functionality.

4. The method of claim 1, wherein determining the first usage constraint further comprises determining an urgency characteristic associated with the M2M functionality.

5. The method of claim 1, wherein determining the first usage constraint further comprises determining a data throughput characteristic associated with the M2M functionality.

6. The method of claim 1, wherein assigning the parameter further comprises assigning a frequency of periodic reporting in relation to the first usage constraint.

7. The method of claim 6, wherein assigning the frequency of periodic reporting in relation to the first usage constraint further comprises adjusting a selected one of a discontinuous reception cycle and a discontinuous transmission cycle.

8. The method of claim 6, wherein assigning the frequency of periodic reporting in relation to the first usage constraint further comprises adjusting a discontinuous reception cycle and a discontinuous transmission cycle.

9. The method of claim 1, wherein determining the first usage constraint further comprises determining a unidirectional data throughput characteristic associated with the M2M functionality.

10. The method of claim 1, further comprising:
    receiving a second signaling message from the first device;
    determining a second usage constraint based upon the second signaling message; and
    assigning a second parameter for resource allocation of the airlink for the first device that complies with the second usage constraint.

11. The method of claim 10, wherein determining the second usage constraint further comprises determining that the service of the first device has discontinued M2M functionality.

12. The method of claim 10, wherein determining the second usage constraint further comprises determining that the first device has at least a first service having M2M functionality and at least a second service having a non-M2M functionality.

13. The method of claim 1, wherein receiving the first signaling message further comprises receiving a plurality of M2M indicators, each M2M indicator conveying applicability of each of a plurality of services corresponding to network bearers terminating at the first device.

14. The method of claim 1, wherein receiving the first signaling message further comprises receiving a plurality of M2M indicators, each M2M indicator conveying applicability of each service of a group of services corresponding to network bearers terminating at the first device.

15. The method of claim 1, wherein receiving the first signaling message further comprises receiving a plurality of M2M indicators, wherein each M2M indicator indicates whether an object of the first device should be considered to be an M2M object.

16. The method of claim 15, wherein the M2M object corresponds to the first device.

17. The method of claim 15, wherein the M2M object corresponds to the service.

18. The method of claim 15, wherein the M2M object corresponds to a group of services including the service.

19. The method of claim 1, further comprising:
determining a plurality of usage constraints associated with the M2M functionality comprising one or more of mobility, power limitation, and fixed usage of an uplink and a downlink of the airlink; and
assigning throughput and intervals for the first device to utilize the uplink and the downlink respectively in response to the plurality of usage constraints.

20. At least one processor for wireless communication, comprising:
a first module for receiving, at a network apparatus of a network, a first signaling message from a first device, wherein the first signaling message includes a machine-to-machine (M2M) indicator having a boolean flag value that is changeable between multiple values, the multiple values including a first value and a second value, the first value indicating an M2M functionality for a service of the first device, the second value indicating a non-M2M functionality for the service;
a second module for determining a first usage constraint associated with the service based on the value of the M2M indicator, wherein the determining further comprises accessing subscription data from a home network via a core network; and
a third module for assigning a parameter for resource allocation of an airlink for providing the service to the first device that complies with the first usage constraint.

21. A non-transitory computer-readable medium storing computer-executable code for wireless communication, comprising:
code for causing a computer to receive, at a network apparatus of a network, a first signaling message from a first device, wherein the first signaling message includes a machine-to-machine (M2M) indicator having a boolean flag value that is changeable between multiple values, the multiple values including a first value and a second value, the first value indicating an M2M functionality for a service of the first device, the second value indicating a non-M2M functionality for the service;
code for causing the computer to determine a first usage constraint associated with the service based on the value of the M2M indicator, wherein the determining further comprises accessing subscription data from a home network via a core network; and
code for causing the computer to assign a parameter for resource allocation of an airlink for providing the service to the first device that complies with the first usage constraint.

22. An apparatus for wireless communication, comprising:
means for receiving, at a network apparatus of a network, a first signaling message from a first device, wherein the first signaling message includes a machine-to-machine (M2M) indicator having a boolean flag value that is changeable between multiple values, the multiple values including a first value and a second value, the first value indicating an M2M functionality for a service of the first device, the second value indicating a non-M2M functionality for the service;
means for determining a first usage constraint associated with the service based on the value of the M2M indicator, wherein the determining further comprises accessing subscription data from a home network via a core network; and
means for assigning a parameter for resource allocation of an airlink for providing the service to the first device that complies with the first usage constraint.

23. An apparatus for wireless communication, comprising:
a transceiver for receiving, at a network apparatus of a network, a first signaling message from a first device, wherein the first signaling message includes a machine-to-machine (M2M) indicator having a boolean flag value that is changeable between multiple values, the multiple values including a first value and a second value, the first value indicating an M2M functionality for a service of the first device, the second value indicating a non-M2M functionality for the service;
determining a first usage constraint associated with the service based on the value of the M2M indicator, wherein the determining further comprises accessing subscription data from a home network via a core network; and
a scheduler for assigning a parameter for resource allocation of an airlink for providing the service to the first device that complies with the first usage constraint.

24. The apparatus of claim 23, wherein the computing platform is further for determining the first usage constraint by determining a mobility characteristic associated with the M2M functionality.

25. The apparatus of claim 23, wherein the computing platform is further for determining the first usage constraint by determining a power characteristic associated with the M2M functionality.

26. The apparatus of claim 23, wherein the computing platform is further for determining the first usage constraint by determining an urgency characteristic associated with the M2M functionality.

27. The apparatus of claim 23, wherein the computing platform is further for determining the first usage constraint by determining a data throughput characteristic associated with the M2M functionality.

28. The apparatus of claim 23, wherein the scheduler is further for assigning the parameter by assigning a frequency of periodic reporting in relation to the first usage constraint.

29. The apparatus of claim 28, wherein the scheduler is further for assigning the frequency of periodic reporting in relation to the first usage constraint by adjusting a selected one of a discontinuous reception cycle and a discontinuous transmission cycle.

30. The apparatus of claim 28, wherein the scheduler is further for assigning the frequency of periodic reporting in relation to the first usage constraint by adjusting a discontinuous reception cycle and a discontinuous transmission cycle.

31. The apparatus of claim 23, wherein the computing platform is further for determining the first usage constraint by determining a unidirectional data throughput characteristic associated with the M2M functionality.

32. The apparatus of claim 23, wherein the transceiver is further for receiving a second signaling message from the first device;
 wherein the computing platform is further for determining a second usage constraint based upon the second signaling message; and
 wherein the scheduler is further for assigning a second parameter for resource allocation of the airlink for the first device that complies with the second usage constraint.

33. The apparatus of claim 32, wherein the computing platform is further for determining the second usage constraint by determining that the service of the first device has discontinued M2M functionality.

34. The apparatus of claim 32, wherein the computing platform is further for determining the second usage constraint by determining that the first device has at least a first service having M2M functionality and at least a second service having a non-M2M functionality.

35. The apparatus of claim 23, wherein the transceiver is further for receiving the first signaling message further comprises receiving a plurality of indicators, each indicator conveying applicability of each of a plurality of services corresponding to network bearers terminating at the first device.

36. The apparatus of claim 23, wherein the transceiver is further for receiving the first signaling message further comprises receiving a plurality of M2M indicators, each M2M indicator conveying applicability of each service of a group of services corresponding to network bearers terminating at the first device.

37. The apparatus of claim 23, wherein the transceiver is further for receiving the first signaling message further comprises receiving a plurality of M2M indicators, wherein each M2M indicator is a boolean flag indicating whether an object of the first device should be considered to be an M2M object.

38. The apparatus of claim 37, wherein the M2M object corresponds to the first device.

39. The apparatus of claim 37, wherein the M2M object corresponds to the service.

40. The apparatus of claim 37, wherein the M2M object corresponds to a group of services including the service.

41. The apparatus of claim 23, wherein the computing platform is further for determining a plurality of usage constraints associated with the M2M functionality comprising one or more of mobility, power limitation, and fixed usage of an uplink and a downlink of the airlink; and
 wherein the scheduler is further for assigning throughput and intervals for the first device to utilize the uplink and the downlink respectively in response to the plurality of usage constraints.

42. A method for wireless communication, comprising:
 transmitting, by a first device, a first signaling message to a network apparatus of a network, wherein the first signaling message includes a machine-to-machine (M2M) indicator having a boolean flag value that is changeable between multiple values, the multiple values including a first value and a second value, the first value indicating an M2M functionality for a service of the first device, the second value indicating a non-M2M functionality for the service determining a first usage constraint associated with the service based on the value of the M2M indicator, wherein the M2M indicator is obtained from subscription data obtained from a home network via a core network; and
 receiving an assignment of a parameter for resource allocation of an airlink for the first device that complies with a first usage constraint associated with the service based on the value of the M2M indicator.

43. At least one processor for wireless communication, comprising:
 a first module for transmitting, by a first device, a first signaling message to a network apparatus of a network, wherein the first signaling message includes a machine-to-machine (M2M) indicator having a boolean flag value that is changeable between multiple values, the multiple values including a first value and a second value, the first value indicating an M2M functionality for a service of the first device, the second value indicating a non-M2M functionality for the service; and
 a second module for receiving an assignment of a parameter for resource allocation of an airlink for the first device that complies with a first usage constraint associated with the service based on the value of the M2M indicator,
 wherein the M2M indicator is obtained from subscription data obtained from a home network via a core network.

44. A non-transitory computer-readable medium storing computer-executable code for wireless communication, comprising:
 code for causing a first device to transmit a first signaling message to a network apparatus of a network, wherein the first signaling message includes a machine-to-machine (M2M) indicator having a boolean flag value that is changeable between multiple values, the multiple values including a first value and a second value, the first value indicating an M2M functionality for a service of the first device, the second value indicating a non-M2M functionality for the service; and
 code for causing the first device to receive an assignment of a parameter for resource allocation of an airlink for the first device that complies with a first usage constraint associated with the service based on the value of the M2M indicator,
 wherein the M2M indicator is obtained from subscription data obtained from a home network via a core network.

45. An apparatus for wireless communication, comprising:
 means for transmitting, by a first device, a first signaling message to a network apparatus of a network, wherein the first signaling message includes a machine-to-machine (M2M) indicator having a boolean flag value that is changeable between multiple values, the multiple values including a first value and a second value, the first value indicating an M2M functionality for a service of the first device, the second value indicating a non-M2M functionality for the service; and
 means for receiving an assignment of a parameter for resource allocation of an airlink for the first device that complies with a first usage constraint associated with the service based on the value of the M2M indicator,
 wherein the M2M indicator is obtained from subscription data obtained from a home network via a core network.

46. An apparatus for wireless communication, comprising a transceiver for:
 transmitting, by a first device to a network apparatus of a network, a first signaling message, wherein the first signaling message includes a machine-to-machine (M2M) indicator having a boolean flag value that is changeable between multiple values, the multiple values including a first value and a second value, the first value indicating an M2M functionality for a the service, the second value indicating a non-M2M functionality for a the service; and receiving an assignment of a parameter for resource allocation of an airlink for the first device that complies with a first usage constraint associated with the service based on the value of the M2M indicator, wherein the M2M indicator is obtained from subscription data obtained from a home network via a core network.

47. The apparatus of claim 46, wherein the transceiver is further for transmitting the first signaling message by indicating a mobility characteristic associated with the M2M functionality.

48. The apparatus of claim 46, wherein the transceiver is further for transmitting the first signaling message by indicating a power characteristic associated with the M2M functionality.

49. The method of claim 1, further comprising:

receiving a request for a long discontinuous reception cycle from the first device; and configuring the long discontinuous reception cycle for the first device based on the request.

50. The method of claim 4, wherein the urgency characteristic comprises a low priority indicator indicating that the first device is configured for low access priority.

51. The method of claim 4, wherein the urgency characteristic comprises an indication that the first device is delay-tolerant.

52. The apparatus of claim 23, wherein the transceiver is further for receiving a request for a long discontinuous reception cycle from the first device, and wherein the computing platform is further for configuring a the long discontinuous reception cycle for the first device based on the request.

53. The apparatus of claim 26, wherein the urgency characteristic comprises a low priority indicator indicating that the first device is configured for low access priority.

54. The apparatus of claim 26, wherein the urgency characteristic comprises an indication that the first device is delay-tolerant.

55. The apparatus of claim 46, wherein the parameter that complies with the first usage constraint comprises an adjusted parameter that complies with an urgency characteristic associated with the M2M functionality.

56. The apparatus of claim 55, wherein the urgency characteristic comprises a low priority indicator indicating that the first device is configured for low access priority.

57. The apparatus of claim 55, wherein the urgency characteristic comprises an indication that the first device is delay-tolerant.

58. The method of claim 13, wherein the plurality of M2M indicators comprise a bitmap indicating which of the plurality of services require M2M functionality.

59. The method of claim 1, further comprising receiving a second signaling message from a second device, wherein the second signaling message includes the M2M indicator.

60. The method of claim 1, wherein the value of the M2M indicator is changed between the multiple values by the first device.

* * * * *